United States Patent
Voigt

[15] 3,680,931
[45] Aug. 1, 1972

[54] SPHERICAL, LAYER-SHAPED SELF-ADJUSTING BEARING FOR SHAFTS

[72] Inventor: Gottfried Voigt, Nieder-Eschbach, Germany

[73] Assignee: Braun A. G., Frankfurt am Main, Germany

[22] Filed: June 4, 1971

[21] Appl. No.: 150,140

[30] Foreign Application Priority Data

June 4, 1970 Germany............P 20 27 414.0

[52] U.S. Cl......................................................308/72
[51] Int. Cl.............................................F16c 23/04
[58] Field of Search...................................388/29, 72

[56] References Cited

FOREIGN PATENTS OR APPLICATIONS 563,593  1/1958  Belgium..........................308/72

Primary Examiner—Martin P. Schwadron
Assistant Examiner—Frank Susko
Attorney—Ernest F. Marmorex

[57] ABSTRACT

A bearing structure comprising bearing means for rotatably receiving a shaft, a spherical dish and a leaf spring clampingly receiving therebetween the bearing means with the spring in engagement with the bearing means, and a counter-bearing means spaced from the first-mentioned bearing means and in engagement with the spring for supporting the latter, the form of the area of engagement between the spring and at least one of the first-mentioned bearing and counter-bearing means approaching that of a point.

9 Claims, 13 Drawing Figures

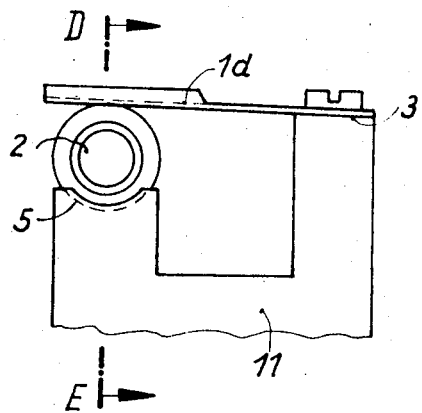
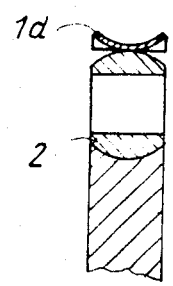
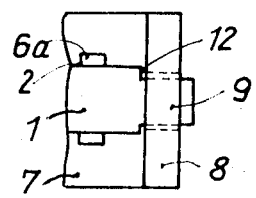
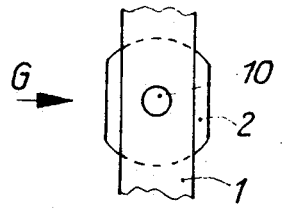
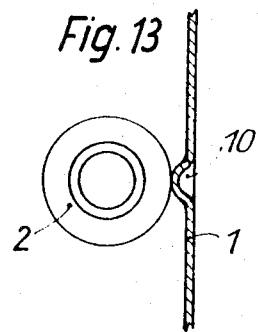

SPHERICAL, LAYER-SHAPED SELF-ADJUSTING BEARING FOR SHAFTS

BACKGROUND OF THE INVENTION

The present invention relates to a spherical, layer-shaped bearing for shafts for receiving relatively small forces, which is self-adjusting and movable between a spherical pan or dish and a leaf spring which is pre-tensioned by a counter-bearing. As counter-bearings for the leaf springs, for instance simple, rectangular windows in opposite bearing ridges or webs maybe used. Such bearing structure which are quite often and mathematically not quite correctly called "spherical cap bearings" are usually employed in various kinds of small machines. Thus, for instance, they are utilized for supporting the rotor shaft of a small electric motor, such as in domestic appliances in which this rotor shaft is simultaneously the sole shaft of the machine. However, such bearings are also used for rotably supporting other shafts in small electrically operated machines.

Although these bearings are very simple and are preferred because of their simple arrangement and form experience with these bearings has shown that they do have considerable disadvantages.

Thus, for instances, the ability of the bearing for self-alignment or adjustment remains rather poor despite the spherical layer-shaped design of the bearing. More particularly, the self-adjusting or re-adjusting of the bearing is not exact enough. For instance, due to a distortion in the rotor shaft or in the above-mentioned spring or due to edging of the spring, an uneven support of the shaft results which should be immediately compensated for by a corresponding self-adjusting movement of the spherical layer-shaped bearing in its spherical pan or dish. If this compensation does not materialize because of the insufficient or poor self-adjusting ability of the bearing or because of a lack of sensitivity of the self-adjustment of the bearing, it will be obvious that a greater heating of the bearing, a more rapid wear and even a more or less strong and fast damage to the bearing will occur, but quite frequently also damage to the shaft itself. This holds true especially and to an ever increasing degree because of the high and of often very high speed of rotation of the shafts which in machines of the above mentioned type are mostly used. Uselessness of or damage to one or several bearings or of the rotor shaft with such machines very often means practically a total loss of the machine so that due to the just described disadvantages a relatively high total damage may result.

Efforts to overcome the above-mentioned disadvantages by corresponding changes in the dimension of the various elements of the bearing construction, for instance by making the leaf-spring weaker while keeping all other factors the same, naturally will fail since certain dimensions of the structural elements are absolutely pre-determined under the given forces occuring in these structures, to make the same basically functionally operative.

It is, an object of the present invention to overcome the above-mentioned disadvantages of heretofore known bearings of the spherical, layer-shaped type.

It is still another object of the present invention to provide such spherical, layer-shaped bearing for shafts, especially for small motors, in which proper and very sensitive self-adjustment is possible while maintaining the simplicity and solidity of the bearing structure.

BRIEF SUMMARY OF THE PRESENT INVENTION

The above mentioned disadvantages of the prior art bearings of the type in question, have been overcome in accordance with the present invention by designing the counter-bearing or bearings of the leaf spring and/or of the leaf spring proper in such a manner that the supporting surface of the leaf spring on its counter-bearing or bearings and/or on the surface of the bearing approaches as closely as possible the form of a point.

BRIEF DESCRIPTION OF THE DRAWINGS

The invention is illustrated by way of example in the attached drawings, in which:

FIG. 9 is a side view of a modified bearing structure in accordance with the present invention, with one counter-bearing for the leaf spring;

FIG. 10 is a section taken along the line D–F of FIG. 9

FIG. 11 is a view as seen in the direction of the arrow F shown in FIG. 1;

FIG. 12 illustrates a modified leaf spring with a circular bead in the area of the shaft bearing;

FIG. 13 is a side view of the spring of FIG. 12 as seen in the direction of the arrow G.

DETAILED DESCRIPTION OF PREFERRED EMBODIMENTS

Figure 1:
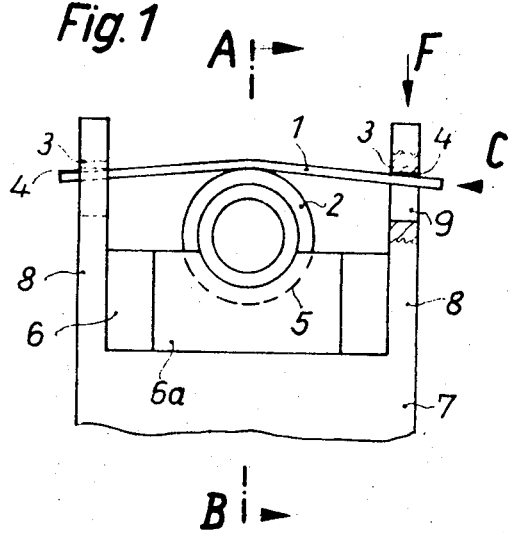
FIG. 1 is a front view of a bearing designed in accordance with the present invention, in assembled condition.
Figure 2:
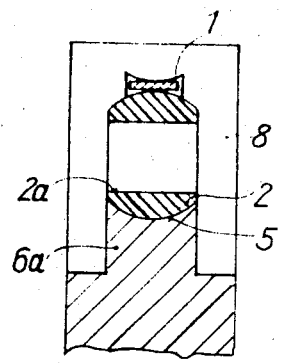
FIG. 2 is a section taken along the line A–B of FIG. 1

Referring now to the drawing in detail, and FIGS. 1 and 2 in particular, a spherical, layer-shaped bearing 2 is clamped between a spherical dish or pan 5 and a leaf spring 1, and thereby fixedly held. However, it is movable within the spherical dish 5 for purposes of self-adjustment. The reference numeral 2a designates the bore for the shaft to be journaled. Leaf spring 1 is pretensioned by means of counter-bearings 3. The spring and the pretension thereof are selected in conformity with the prevailing forces in and at the bearing 2.

The supporting surface 4 of the leaf spring 1 on its counter-bearings 3 approaches as closely as possible the shape of a point. In the case of FIG. 1 this is accomplished by the arched contour 4a of the supporting surface for the spring 1 at the counter-bearing 3.

The spherical dish 5 is provided in a thickened portion 6a of the ribs 6, while these ribs 6 constitute the connection to the ridges 8 for the spring counter-bearings 3. Elements 6, 6a and 8 are made from one piece and as such are integrated into the basic machine body 7 which is, for instance, made of synthetic material. On the right hand side of FIG. 1, the surrounding portion of the counter-bearing 3 are shown in section ridge 8.

Several forms of the structure have proved advantageous as basic designs or further developments of the invention. Thus, in one of the advantageous variations, the supporting surface for the leaf spring at its two counter-bearings each has a contour which extends perpendicularly to the longitudinal direction of the spring having a flat rectangular cross section, said contour being arched symmetrically towards the springs, with the outermost point of the arch being located in the middle. The arrangement can also be such that the supporting surface for the leaf spring at its two counter-bearings has a triangular contour extending perpendicularly to the longitudinal direction of the flat rectangular cross section of the spring, the triangular contour being symmetrical, with the tip of the triangle directed towards the spring being located in the center.

Figure 3:
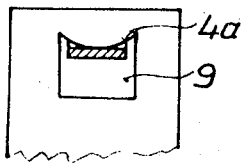
FIG. 3 illustrates one counter-bearing with bearing surface, as seen in the direction of the arrow C of FIG. 1.
Figure 4:
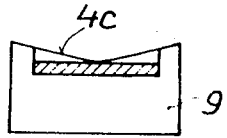
FIG. 4 and 5 show different shapes of the supporting surface of the leaf spring at their counterbearings.
Figure 5:
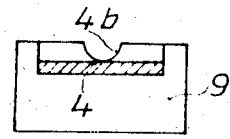

More specifically, with respect to FIGS. 3 to 5, when looking in the direction of the arrow C (FIG. 1) the showing of FIG. 3 is obtained. The sleeve spring 1 itself is in this figure as well as in others, for reasons of clarity, shown on the supporting surface in section. In FIGS. 4–8 in addition show the window-like cut-outs 9 at the counter-bearing 3 in the ridges 8, which serve for naturally fixing or arresting the spring 1. Reference characters 4a and 4b designate two different contours of the supporting surface for the spring 1 at their counter-bearing 3 as they are symmetrically arched towards flat leaf spring 1. In still another arrangement shown in FIG. 4, the contour 4c is triangular.

In still another advantageous design, the leaf spring itself is arched symmetrically towards the flat or plane supporting surface at its two counterbearings or is triangular with the tip of the triangle directed towards the supporting surface.

These different modifications of the invention are suitable for various cases to achieve a fine adjustment depending on the given forces and space factors and the various parts of the total bearing structure so that in each case an immediately reacting, satisfactory self-adjusting of the bearing takes place.

Figure 6:
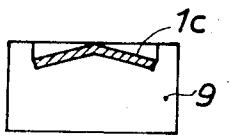
FIG. 6 – 8 are side views of various cross-sectional shapes of the leaf spring, with the supporting surface of the counter-bearing being flat.
Figure 7:
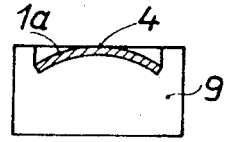
Figure 8:
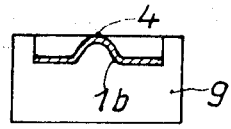

These possibilities are shown in FIGS. 6 to 8 and are given by a corresponding shape of the cross section of the spring, such as represented by reference numerals 1a, 1b, and 1c (arched and triangular shapes) which rest against a flat or plane supporting surface of the counter-bearing.

A still further modification of the present invention which is very suitable for certain applications, and in which there is provided only one counter-bearing for the leaf spring and which leaf spring is connected there to the counter-bearing, the leaf spring is in the area of the counter-bearing provided with a flat rectangular cross-section and in the area of its support on the shaft bearing with a cross section that is symmetrically arched towards the bearing.

When using only one counter-bearing for spring 1 as shown in FIGS. 9 and 10, the spring 1 is connected to this counter-bearing 3 by means of a screw. The cross-section of the spring is flat and rectangular. Also in this case, the spring 1 rests on bearing 2 under pretension and is within the area of the support on the bearing provided with an arched symmetrical cross-section 1d (see FIG. 10). With this design a very small supporting surface is obtained since the desired approach to the form of a point is favored by the spherical surface of the bearing 2. This design is suitable for certain special cases. Reference numeral 11 designates the base body of the machine.

It has proved to be very advantageous to provide the leaf spring (when two counter-bearings are present) with a stop for preventing movement of the spring in longitudinal direction, this stop being formed by the decreased width of the cross section at both longitudinal ends of the leaf's point. Due to the small supporting surface of the leaf spring which in accordance with the present invention approaches as closely as possible the shape of the point, in some cases the spring tends to be moved in longitudinal direction, and the just described modification represents a simple and safe measure for preventing such movement. In this instance, the dimensioning may be such that the adaptability of the spring to the movement of the bearing is not impeded. Such arrangement is shown in FIG. 11.

FIG. 11 represents a view of FIG. 1 as taken in the direction of the arrow F and shows a stop 12 for preventing displacement of the spring 1 in longitudinal direction thereof.

For a special case requiring a very sensitive adjustment, in a further development of the present invention when using one leaf spring with two counter-bearings and with the supporting surface at the counter bearing being arched or the like as described above, the leaf spring which is throughout of flat rectangular cross-section is provided within the area of its support on the shaft bearing with a bead arched centrally towards the shaft bearing. This bead may be of circular cross-section or may be stretched in longitudinal direction.

In this instance, illustrated in FIGS. 12 and 13 one leaf spring and two counter-bearings with arch supporting surfaces are used similar to FIG. 1. The flat rectangular cross-section of spring 1 which otherwise prevails throughout is provided with a central bead 10 of circular cross section and more specially in the area of the support 1 on shaft bearing 2. Consequently, the leaf spring and the counter-bearing have a shape which lead to the desired supporting surface of the spring 1 in the shape of a point.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

I claim:

1. A bearing structure comprising: bearing means for rotatably receiving a shaft, spherical dish means, leaf spring means, said two last-mentioned means clampingly receiving therebetween said bearing means with said spring means in engagement with said bearing means, and counter-bearing means spaced from said bearing means and in engagement with said spring means for supporting the latter, the form of the area of engagement between said spring means and at least one of said bearing and counter-bearing means approaching that of a point.

2. A bearing structure according to claim 1, wherein said leaf-spring means has a flat, rectangular cross-section, and wherein the area of engagement between said leaf-spring means and said counter-bearing means is formed by contour means arched symmetrically towards said spring means and in a direction perpendicular to the longitudinal extension of said spring means, the peak of said arched contour means being in the center thereof.

3. A bearing structure according to claim 1, wherein said leaf-spring has a flat, rectangular cross-section, and wherein the area of engagement between said spring means and said counter-bearing means is formed by triangular contour means symmetrically pointing toward said spring means in a direction perpendicular to the longitudinal extension of said spring means, with the tip of the triangular contour means being located in the center thereof.

4. A bearing structure according to claim 1, wherein said counter-bearing means forms a plane surface means at the area of engagement with said spring means, and wherein the leaf spring means has a cross-section at said area of engagement with said counter-bearing means which is symmetrically arched toward said plane surface means.

5. A bearing structure according to claim 1, wherein said counter-bearing means forms plane surface means at the area of engagement with said spring means, and wherein said leaf spring means has a triangular cross-section at said area of engagement with said counter-bearing means, with the tip of said triangular cross-section pointed towards said surface means.

6. A bearing structure according to claim 1, wherein said leaf-spring means has a flat, rectangular cross-section throughout its length and at its area of engagement with said bearing means is provided with a central bead arched towards said bearing means.

7. A bearing structure according to claim 6, wherein said bead has a circular cross-section.

8. A bearing structure according to claim 1, wherein said counter-bearing means comprises a single counter-bearing, wherein said leaf-spring means is fixedly connected to said counter-bearing, and wherein the area of engagement between said spring means and said counter-bearing is a flat surface, the area of engagement between said spring means and said bearing means being formed by the contour of the cross-section of said spring means being symmetrically arched towards said bearing means.

9. A bearing structure according to claim 1, which includes stop means for said leaf-spring means at said counter-bearing means, formed by narrowing the width of the cross-section of said spring means at both ends.

* * * * *